March 31, 1931. C. W. CHERRY 1,799,038
LATHE FEED MECHANISM
Filed Feb. 25, 1930
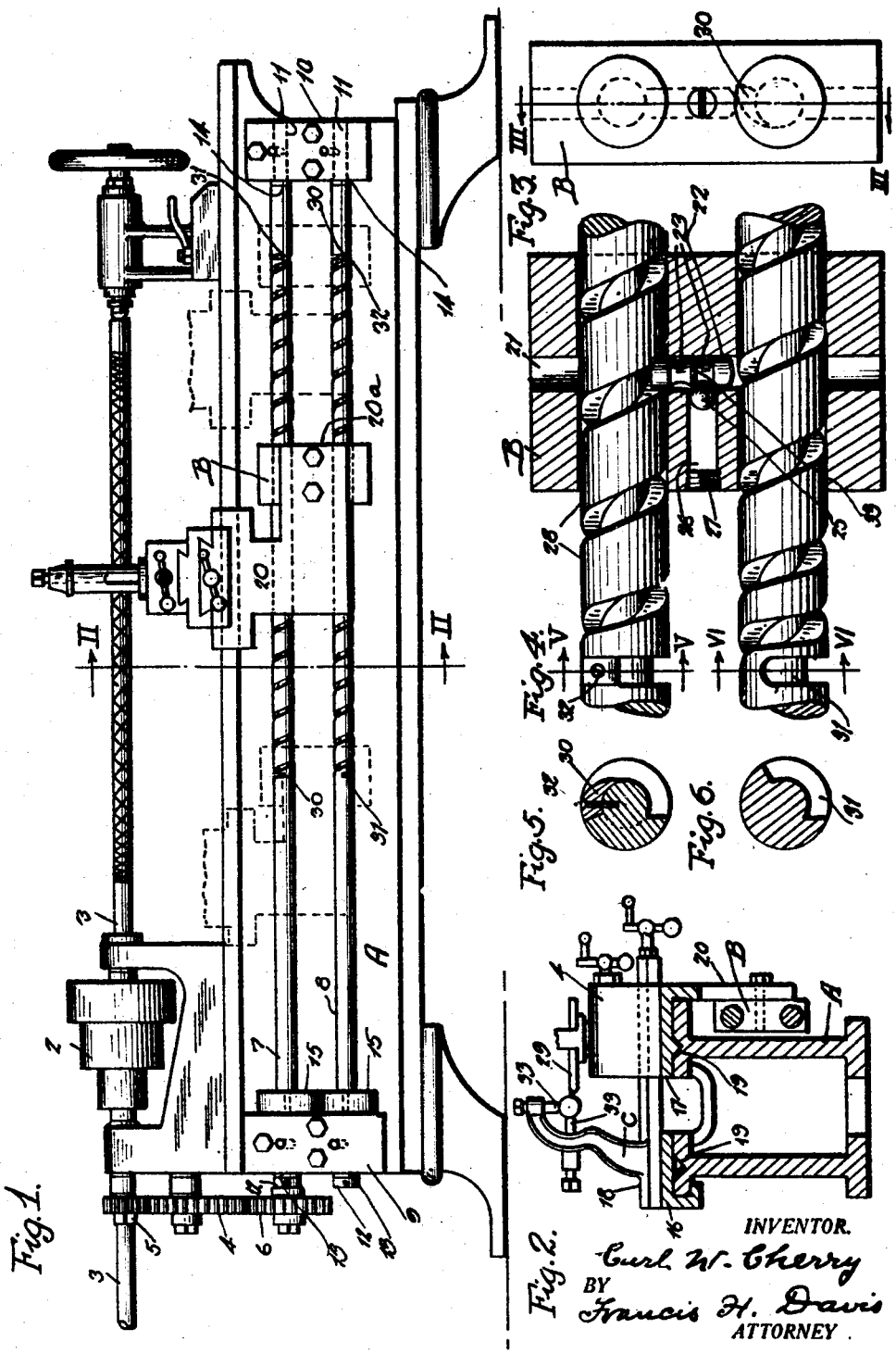
INVENTOR.
Carl W. Cherry
BY
Francis H. Davis
ATTORNEY.

Patented Mar. 31, 1931

1,799,038

UNITED STATES PATENT OFFICE

CARL W. CHERRY, OF CARMEL, CALIFORNIA

LATHE-FEED MECHANISM

Application filed February 25, 1930. Serial No. 431,172.

The present invention relates to metal turning, and more particularly to an automatically reciprocative lathe attachment for traversing a lathe tool pre-determined distances longitudinally of a lathe in opposite directions.

In my windshield wiper application, Serial No. 372,742 now allowed in the United States Patent Office I disclose a certain "Horsfall screw", and the present invention has for its chief object to provide means whereby such screws may be speedily and accurately turned in standard lengths from round bar stock such as brass, steel or other suitable substance.

A further object is to provide an apparatus of the kind which may be attached to any suitable lathe so as to carry a lathe-tool to and fro along the work, being so constructed and devised that the axial direction is automatically reversed at certain set points to left or right. Suitable forward feed of the tool being provided for in the usual cross-feed of the lathe.

With the above objects in view the invention has particular relation to certain novel features of construction, operation and arrangement of parts, an example of which is given in this specification, particularly pointed out in the claims and illustrated in the accompanying drawings, wherein:

Figure 1 is a side elevational view of a lathe embodying my invention.

Fig. 2 is a section taken on the line II—II of Fig. 1.

Fig. 3 is an end view of the detent-block on a larger scale.

Fig. 4 is a vertical section through the detent-block on the same scale as Fig. 3 taken on the line III—III of Fig. 3.

Fig. 5 is a section taken on the line V—V of Fig. 4.

Fig. 6 is a section taken on the line VI—VI of Fig. 4.

Like indicia of reference refer to like parts throughout the several views.

In the drawings the lathe structure A is of usual construction being provided with the drive-cone 2 adapted to run the bar stock 3 to be operated on at different speeds by a drive-belt or other suitable agent such as a motor.

The idle gear 4 inter-meshes with the drive pinion 5 thus imparting motion to the gear 6 fast to the upper screw 7 of my device. Said screw with the lower companion screw 8 vertically below and parallel therewith is suitably attached to the side of said structure by the respective bearings 9 and 10 being revoluble therein. The bearing 9 is preferably bored the full size of said screw whereas the bearing 10 is bored smaller as is well indicated by dotted lines at 11—11, Fig. 1, obviously, said bearings may be bushed with suitable antifriction members. Outside the bearing 9 said screws are provided with the outer collars 12—12 pinned in place, and the thrust washers 13—13, suitable washers 14—14 being provided on the inside of the bearing 10.

The pinions 15—15 in intermeshed relation are keyed fast to the screws 7 and 8 so as to work against the inner edge of the bearing 9, an arrangement which causes said screws 7 and 8 to run in opposite directions for a purpose to be explained.

By reference to Fig. 2, the saddle elements 16 and 17 (bridged across by the cross-feed member 18) are disposed above the lathe structure so as to be moved in unison axially of the structure in either direction guided by the ways 19.

The apron 20 depends outwardly from the saddle element 17 so as to leave clearance between the inner surface thereof and the adjacent wall of said structure for longitudinal traverse of the element B.

According to Figs. 2, 3 and 4 the element B is a rectangular steel block, which in the device of my practice measures 1 by 2 by 3 inches. It is perforated the 2 inch way to be a sliding fit on the screws 7 and 8, centrally perforated the 3 inch way at 21 to receive the detent 22 and centrally bored from left to right to intersect said perforation 21. Said detent is a nice sliding fit in the perforation 21, of round section and sufficient length for one end thereof to clear the groove of one said screw when in full engagement with the other. Adjacent the middle, the detent is provided with the semi-circular grooves 23—23 spaced slightly apart so as to leave a rib between them and of the same arc as the trip-ball 25, the spring 26 being disposed under compression between said ball and the inner end of the retaining screw 27. Said block B and the detent being either case-hardened or tempered to ensure efficient wear.

The screws 7 and 8 have square threads of coarse pitch and provide sufficient depth of thread for said detent to follow with ample engagement within the walls 28.

Said threaded portions extend for sufficient distance to carry the tool 29 the required distance along the stock 3, the remaining portion to the left being plain; whereas, the remaining portion to the right is plain until coming to the washer 14 whereupon it is reduced as indicated at 11—11 thus forming a shoulder to obviate axial displacement to the right to relieve excessive wear between the collars 12 and the contacting surface of the bearing 9.

The threaded portions of said screws 7 and 8 are co-mensurably diminished in pitch adjacent their respective ends, and then terminate by traversing the respective screws at right angles for a distance of about one-third of the circumference for a purpose to be explained; well shown in Fig. 4.

All four said screw ends are provided with automatically co-active means for disengagement of said detent with one said screw and synchronous engagement with the other. Said means comprising the terminating wedge member 30 on one screw and the complemental recess element 31 on the other, said member and element being in the same vertical plane and so timed that when the related detent end runs up the wedge to the periphery of the screw the opposite end thereof is engaged with respect to said companion screw.

Said wedge is preferably a renewable separate member of specially hardened steel which may well be secured in place by the wedge-screw 32.

It should be noted that said wedge and said element are oppositely disposed at the different ends of said screws proper, as is well shown in Fig. 1.

The element B may be attached directly to the apron 20 as shown in Fig. 2 or otherwise fastened to the lateral extension 20a in the manner shown in Fig. 1, the main object being to fasten said element to said apron so that when the respective screws 7 and 8 are revolved in opposite directions, longitudinal movement will be imparted to the tool 29 in either direction according to whichever of said screws is engaged by said detent; the forward thrust of the tool being opposed by adjustable jaws 33—33 of the follower-rest C.

When in operation, it should be noted, the moment a detent end begins to mount the wedge 30 the ball 25 begins to compress the spring 26 by receding toward the screw 27, a further rise carries the rib 33 clear past said ball which now engages the other groove thus locking said detent in relation to the opposite screw.

It should be further noted that the aforesaid reduction in pitch near the ends of said screws 7 and 8 produces a corresponding pitch reduction at the respective ends of the Horsfall screw being turned, which it is desirable to attain.

In accordance with the provisions of the patent statutes I have described herein the principles of operation of my invention, together with the apparatus which I now consider to represent the best embodiments thereof; but I desire to have it understood that the apparatus as shown is only illustrative, and that the invention may be carried out by other means and applied to uses other than those above set out.

I claim:

1. A device of the kind described comprising in combination, a lathe, a driven element adapted to revolve the work, means carried by the element to rotate one of two parallel screws, said screws disposed in end bearings in the same vertical plane parallel with the lathe, means carried by one said screw to rotate the other in the opposite direction, a detent block longitudinally traversable of said screws, detent means carried by the block at right angles to said screws and adapted to engage the threads thereof for axial thrust, means at the end of one screw to automatically disengage said detent therefrom and synchronously engage the opposite screw, and identical means carried by the end of said opposite screw to automatically disengage said detent therefrom and cause re-engagement with the former screw, means yieldable to lateral pressure to lock said detent in alternate positions and means connecting said block with the longitudinal feed-carriage of the lathe, said detent block bored smooth for slidable movement along said screws, having a vertical central perforation adapted to accommodate a vertically disposed detent member, a central horizontal bore meeting said perforation, a detent housed in said perforation and adapted for alternate engagement between said parallel screws, twin groove means formed on said detent, yieldable means complemental to said grooves housed in said bore, a spring element under compression in said bore between said complement means and a closure means.

2. In a device as set forth in claim 1, the threads of said screws of progressively reduced pitch adjacent their respective ends, a suitable portion of each thread end formed perpendicular to the screw axis to constitute a rest period for said detent while moving from one screw to the other.

3. In a device according to claim 1, the alternate ends of said parallel screws provided with wedge means adapted to disengage said detent and move it into engagement with a complemental recess of the other screw, both said wedge and recess extending at right angles to said screws for approximately one third the circumference of said screws.

4. In a device as characterized by claim 1, said parallel screws provided at alternate ends with removable wedge members adapted to co-operate with a detent end for axial movement of said detent from one screw to the other.

In testimony whereof I affix my signature this 13th day of February, 1930.

CARL W. CHERRY.